(12) United States Patent
Roblett et al.

(10) Patent No.: US 8,145,966 B2
(45) Date of Patent: Mar. 27, 2012

(54) REMOTE TESTING SYSTEM AND METHOD

(75) Inventors: Terence Alfred Roblett, Hoddesdon (GB); Graham Anthony Ward, Portchester (GB)

(73) Assignee: Astrium Limited, Stevenage, Hertfordshire (GB)

( * ) Notice: Subject to any disclaimer, the term of this patent is extended or adjusted under 35 U.S.C. 154(b) by 97 days.

(21) Appl. No.: 12/602,941

(22) PCT Filed: Jun. 5, 2008

(86) PCT No.: PCT/GB2008/050410
§ 371 (c)(1),
(2), (4) Date: Dec. 3, 2009

(87) PCT Pub. No.: WO2008/149153
PCT Pub. Date: Dec. 11, 2008

(65) Prior Publication Data
US 2010/0218044 A1    Aug. 26, 2010

(30) Foreign Application Priority Data

Jun. 5, 2007  (EP) .................................. 07270030
Jun. 5, 2007  (GB) ................................. 0710720.4

(51) Int. Cl.
*G06F 11/00*  (2006.01)
*G06F 15/16*  (2006.01)
*G01R 31/28*  (2006.01)
*H04B 17/00*  (2006.01)

(52) U.S. Cl. ........ 714/737; 714/4.4; 714/6.31; 709/218; 709/219; 455/226.1

(58) Field of Classification Search .................. None
See application file for complete search history.

(56) References Cited

U.S. PATENT DOCUMENTS

| 4,766,595 | A |   | 8/1988 | Gollomp |
| 5,724,504 | A |   | 3/1998 | Aharon et al. |
| 5,794,254 | A | * | 8/1998 | McClain .................. 707/999.01 |
| 6,256,594 | B1 |   | 7/2001 | Yamamoto et al. |
| 6,279,131 | B1 | * | 8/2001 | Archambeau et al. ........ 714/737 |

(Continued)

FOREIGN PATENT DOCUMENTS

EP        1 103 926 B1    5/2001

(Continued)

OTHER PUBLICATIONS

W. Piekarski et al., "Intergrating Virtual and Augmented Realities in an Outdoor Application", Advanced Computing Research Centre, Australia, 1999, pp. 1-10.

(Continued)

*Primary Examiner* — Jeffrey A Gaffin
*Assistant Examiner* — Guerrier Merant
(74) *Attorney, Agent, or Firm* — Buchanan Ingersoll & Rooney PC

(57) ABSTRACT

A method and system of supporting and testing equipment distant from the support system are provided. The method includes the steps of forming a communications link between the equipment and the support system, using the support system to measure performance of the equipment and to provide a set of performance data, providing library data relating to the equipment, comparing the performance data with the library data and analysing the compared data whereby to provide a performance diagnosis of the equipment, all in a substantially continuous real time operation.

16 Claims, 11 Drawing Sheets

U.S. PATENT DOCUMENTS

| | | |
|---|---|---|
| 6,418,392 B1 | 7/2002 | Rust et al. |
| 6,745,011 B1 | 6/2004 | Hendrickson et al. |
| 6,754,844 B1 * | 6/2004 | Mitchell ........................ 714/4.4 |
| 7,113,883 B1 * | 9/2006 | House et al. .................. 702/122 |
| 7,155,639 B2 * | 12/2006 | Gorshenev et al. ......... 714/38.14 |
| 7,302,474 B2 | 11/2007 | Szucs et al. |
| 7,519,861 B2 * | 4/2009 | Mayer et al. .................... 714/28 |
| 7,904,527 B2 | 3/2011 | Sarma |
| 2003/0014149 A1 | 1/2003 | Kreidler et al. |
| 2003/0046663 A1 | 3/2003 | Rogers et al. |
| 2003/0058280 A1 | 3/2003 | Molinari et al. |
| 2003/0229664 A1 | 12/2003 | Hollaway |
| 2004/0236843 A1 * | 11/2004 | Wing et al. ................... 709/219 |
| 2005/0039170 A1 | 2/2005 | Cifra et al. |
| 2005/0066231 A1 | 3/2005 | Szucs et al. |
| 2006/0031476 A1 | 2/2006 | Mathes et al. |
| 2006/0101135 A1 * | 5/2006 | Li ................................. 709/223 |
| 2006/0129892 A1 * | 6/2006 | Diaconu et al. ................. 714/38 |
| 2006/0256012 A1 * | 11/2006 | Fok et al. ...................... 342/457 |
| 2006/0259629 A1 * | 11/2006 | Usmani et al. ................ 709/227 |
| 2007/0005323 A1 | 1/2007 | Patzer et al. |
| 2007/0257660 A1 | 11/2007 | Pleasant et al. |
| 2009/0006023 A1 * | 1/2009 | Tiegs ............................ 702/122 |
| 2009/0066343 A1 * | 3/2009 | Prather ......................... 324/628 |
| 2009/0124250 A1 * | 5/2009 | Topaltzas et al. ............. 455/423 |

FOREIGN PATENT DOCUMENTS

| | | |
|---|---|---|
| EP | 1 229 449 | 8/2002 |
| EP | 1 420 316 A1 | 5/2004 |
| EP | 1 505 505 A1 | 2/2005 |
| GB | 1 477 241 | 6/1977 |
| GB | 2 330 231 A | 4/1999 |
| WO | WO 98/36518 A2 | 8/1998 |
| WO | WO 01/55690 A1 | 8/2001 |
| WO | WO 02/19625 A3 | 3/2002 |
| WO | WO 2004/029808 | 4/2004 |
| WO | WO 2007/005586 A1 | 1/2007 |
| WO | WO 2007/106430 A2 | 9/2007 |

OTHER PUBLICATIONS

International Search Report (PCT/ISA/210) dated Jul. 15, 2008.
Written Opinion of the International Search Authority (PCT/ISA/237) dated Jul. 15, 2008.
European Search Report dated Jan. 8, 2008.
United Kingdom Search Report dated Oct. 5, 2007.
United Kingdom Search Report dated Jan. 15, 2008.
Office Action dated Dec. 29, 2010, issued in the corresponding European Application No. 08 750 805.7-2416.

\* cited by examiner

REMOTE TESTING SYSTEM AND METHOD

FIELD OF THE INVENTION

This invention relates to remote testing, particularly but not exclusively to the remote support, maintenance and testing of equipment, in particular equipment having an electrical or electronic element. The system provides a global remote testing access capability.

BACKGROUND

The maintenance of equipment having an electronic element, which is operated remotely from a maintenance facility, can be a problem. This problem can arise with commercial equipment, but in particular with military equipment operational in the field or in any other military theatre such as sea, air or space. Maintenance of such remotely operated equipment depends upon the availability of test equipment and suitably trained personnel. In the field or theatre, such test equipment and personnel are usually non-vital to the operation being carried out by the equipment and their availability to support, test and maintain the equipment will depend upon their being transported to the scene. It will be appreciated that, for example in a war zone, this may often be a hazardous operation, leading to uncertainty of its completion.

Additional issues with support of remotely operated equipment arise from the diversity of such equipment, its complexity and sophistication. To maintain such a variety of equipment is hugely expensive. The following issues in particular can arise. The test equipment can become obsolete when it is required to support old equipment for many years. Field or theatre test systems can have limited flexibility. This can result in a need for many different types of test system to support many types of equipment. Long test and fault finding times, associated with transport of test equipment and personnel to often inaccessible locations, can result in unacceptable delays and costs. Logistical problems of transporting failed equipment back to maintenance bases can result in extensive turnaround times. Very often when a piece of equipment is tested at a test centre no fault is found. This results in even longer delays in getting the equipment back into service at its original location as further diagnostic work will be required to find the real fault and then repair it. Hence long equipment down times often result due to current lengthy fault-to-repair cycles.

End users have specific needs related to different environments. For example the differences in environment between platforms of the navy, fields of operation of the army and theatres of operations of the air force generate totally different test access requirements.

If say, in operations, there are 250,000 different types of line replaceable unit, all with different multiple test requirements, how will it be possible to meet this enormous demand for testing in a more efficient way?

The above are some examples of difficulties, which arise with support, testing and maintenance of field and theatre military equipment.

SUMMARY OF THE INVENTION

The present invention aims to address the above problems.

According to one aspect of the present invention there is provided a method of supporting equipment distant from a support system, the method including the steps of forming a communications link between the equipment and the support system, using the support system to measure performance of the equipment and to provide a set of performance data, providing library data relating to the equipment, comparing the performance data with the library data, analysing the compared data whereby to provide a performance diagnosis of the equipment, all in a substantially continuous operation.

According to a second aspect of the present invention there is provided a support system for supporting equipment distant from the system, the system including means to form a communications link between the support system and the distant equipment and data processing means, the data processing means including means to measure performance of the equipment, data warehousing means for extracting library data relating to the equipment, means for comparing the equipment performance data and the library data, for analysing the comparison and for providing a diagnosis of the performance of the equipment, wherein the data processing means are capable of processing the said data substantially in a continuous operation.

According to a third aspect of the invention there is provided a support system for supporting equipment distant from the system, the system including means remotely to create a synthetic instrument for measuring performance data for the equipment.

The means remotely to create the synthetic instrument may include a satellite communications link to link the support system with the distant equipment and synthetic instrument.

One or more synthetic instruments may be located on a large military platform, for example a warship, to enable support of a large number of pieces of equipment on the ship. Support of the ship's equipment may then entail the system of the invention being connected, usually via satellite, to the synthetic instrument(s) on the ship.

Where the performance diagnosis indicates that adjustment or repair of the equipment is required, the method preferably includes the step of carrying out such adjustment or repair of the equipment. Where such adjustment or repair can be carried out remotely by the support system, this is included in the method.

The said communications link may be formed via satellite, by the internet or any other suitable means.

The measurement of performance of the equipment is preferably carried out at least partially by use of at least one synthetic instrument, which is preferably a vector signal analyser.

Further features of the invention are as follows: online access to experts; storage of mass library data in data warehousing; data warehouses achieving cross correlation of data, and in real time; kinds of library data made available are equipment model, historic performance data, logistical data etc.; cognitive processing; standardised links to the data warehouses.

It may be appreciated that co-location of instruments, synthetic or otherwise, for RF equipment may be necessary to avoid signal losses. Thus instruments, synthetic or otherwise, may need to be positioned near, or incorporated into, RF equipment for support and test.

Intermittent faults may be tested for by performing a test over a period of time (possibly transparently to the user of the equipment). "Trending" may also be determined by the system by taking successive measurements over a period.

The data processing means may include a central maintenance unit (CMU). The CMU may act as a data warehouse and may, for example, store test strategies, test resource planning, and analysis. Data warehouses may also be included in the system which are specific to equipment to be supported, for example those belonging to test development houses for the equipment.

This preferably achieves real time, or near real time, measurement and response for problem solving anywhere in the world with access to experts anywhere in the world to put them in contact with equipment that is under test. The opinions of the experts can be backed up by instant search engine parametric data on equipment, test models and by automated analysis.

A Vector Signal Analyser (VSA) is an instrument, which allows modulation analysis of modern digital signals. The VSA allows the analysis of both the in-phase (I) and quadrature-phase (Q) components of a signal.

The satellite link may be particularly useful in forming a link between the CMU and the equipment under test, such equipment often being located in positions inaccessible to land-based links.

In making the synthetic measurements access will preferably be available to a vast virtual library of measurements and algorithms to apply to any required equipment type based on a virtual modelling knowledge of the product.

The system of the invention preferably has a generic, or open, architecture design to allow testing of new equipment and new methods of testing when they become available. The system may have various distributed equipment test development establishments each with its own data warehouse responsible for its own specific equipment. The data warehouses are preferably linked via standardised communications links, eg. the LAN interface, to a central real time data warehouse at the CMU. The distributed data warehouses are all capable of acting together with the central data warehouse to process equipment data at high speed in the testing and diagnostics process.

According to a fourth aspect of the invention there is provided a method of testing equipment having modelling, simulation and real world data using test equipment having modelling, simulation and real world data and using logistical data relating to the equipment, the method including the steps of accessing and combining all the said data to provide an overall test model, analysing at least some of the combined data and diagnosing performance of the equipment under test.

The equipment under test and the test equipment may be positioned remote from one another and the said combining step may be effected via a satellite communications link.

At least some of the said data may be held in relational real time data warehouses.

Examples of logistical data are environmental data, how and where the equipment was made, events which have happened to the equipment throughout its life and how the equipment has been maintained.

The step of accessing the said data is preferably effected using searching of multiple distributed data warehouses.

Generic test hardware is based on an open hardware architecture, which is made reconfigurable and flexible by the application of upload & download of data from a global satellite communications network.

Test control, execution and sequencing remotely via satellite is undertaken via the central maintenance unit (CMU). This is the hub of the network with links to real time data warehouses for providing remote command and monitoring based on knowledge based principles.

Command and monitoring occurs at a site local to the device under test which has links remotely via the central maintenance unit to data warehousing for uploading and downloading of remote command and monitoring data.

Remote cognitive synthetic measurement and analysis is applied through the application of virtual measurements to provide dynamically adaptive diagnosis techniques based on software-defined measurements. A cognitive system employs a repertory technique allowing comparison measurements using quantitative data of natural world perceptions, information and goals in a unified process. This enables decisions to be made and expert-based successful actions to be carried out.

Remote station to remote station control and test is possible. Access with appropriate levels of security is provided from any location to any location via the internet and a global satellite network, using the test development houses and, as necessary, the central maintenance unit.

Global coverage via a, preferably secure, system network provides access to the network with the appropriate hierarchical project or product identification-based access rights linked to specific identified users with specified levels of access rights to specified information.

Internet Explorer web-based control and real time performance monitoring is provided throughout the network as all the hardware and man/machine interfaces are preferably real time web compatible. Web based graphic user interfaces provide point-to-point operations anywhere, thus providing remote expert access for test control and monitoring.

Operational simulation, modelling and full functional test functions allow validation and verification of the performance of the device under test with respect to specification and uncertainty analysis margins by combining a full, virtual, model of the test system with a full model of the device under test to check real world equipment responses against the virtual model.

Test coverage is possible from DC through to SHF and EHF and includes all the test domains of all the operational frequency bands according to the requirements of the equipment under test and as may be signed up to by test development houses which are responsible for specific equipment and their associated test capability.

The invention is capable of dealing with 1st, 2nd, 3rd and 4th line test and maintenance regimes for MOD or those for commercial operations. 4th line capability and expertise at 1st line operations are made possible by the provision of expert test information and expert capability at the front line via networked secure communications.

Real time data search engines with drill down capability are in the form of real time data warehouses. This is an instant, intuitive, structured mass storage search engine for retrieval of information, which is linked to a network, preferably global, via the central maintenance unit.

Results and performance analysis are provided by a combination of using simultaneous synthetic measurement, ie. software defined measurement, results analysis based on real time data warehousing, eg. from test development houses, and system modelling tools.

Product logistics and tracking data are made effective by remote access to real time information systems via the CMU, with source product data warehouses providing product traceability.

Productivity and efficiency monitoring, globally, is achievable by the system of the invention. In particular, minimising mean time to repair using the real time data warehouse portfolio to maximise the speed of measurement and diagnosis helps to achieve this. Further, maximising the mean time between failures is achieved by optimising the use of equipment and optimising calibration and maintenance cycles through access to optimised equipment information provided by real time data warehousing.

Asset management and the tracking of movements of equipment in the form of line replaceable units and test equipment are provided by asset management aspects of the real time data warehouses. These provide instant access to real time asset tracking information via a search engine, with access options provided in many different ways depending on the nature of the enquiry, to locate the line replaceable units, test equipment or other products. Many different statistical formats can be used to display and optimize the information presented.

The equipment in service provides feedback in terms of fault-found and performance history to enable the virtual equipment model to be extended throughout its life. This information is linked to technology and upgrade cycles for the equipment to improve through-life performance. This is particularly important with long term in-service equipment.

Video or voice linking to the central maintenance unit provided by the global communications network enhances the nature of the diagnosis by enabling communication on a person to person, person to equipment or person to instrument basis. Equipment source data from test development houses is available both locally and remotely. This data may include the total build state, which may include total engineering aspects from specifications to design diagrams. Provision may thus be made, via the central maintenance unit, to enhance the diagnostic process throughout the network.

Access, via uploaded information from the equipment under test, downloaded information from the data warehouses and information exchange, using information technology informatics science principles of modelling, can enable diagnosis of faults and determination of the necessary corrective actions as a maintenance and support service. In this process, simulation and real world data of both the equipment under test and the test system, together with logistical information both local and remote and use of an information data warehouse provide a total system model.

Test software and modelling data may be uploaded and downloaded remotely via satellite. This is made possible by the application of virtual measurement techniques called "synthetic measurement" and by modelling tools which are made compatible by the design methodology of the test systems and the equipment under test.

Synthetic instruments can be defined as software modular algorithm based products that can undertake a measurement to emulate a dedicated instrument. These instruments can carry out measurements using a collection of traditional hardware instruments or a single traditional hardware instrument with additional software.

Synthetic instruments thus modify the basic design purpose of traditional instruments to provide alternative measurement capabilities.

A test system using synthetic measurement can be a mixture of these types.

Synthetic instruments are of great benefit to the system of the invention as they provide the broadest set of measurement products for a given set of hardware instrumentation. This also provides future proofing of instrumentation by enabling it to be upgraded by simply downloading new software. Equipment to be supported and tested can be provided with embedded test hardware to provide for hosting synthetic measurements. Products can therefore have Built In Self Test (BIST) or Virtual BIST where VBIST capability includes compatibility of the architecture to host synthetic measurements.

Synthetic measurements are thus important enablers of faster real time measurements for testing.

'Natural' instrumentation systems are made up of pre-defined hardware components, such as digital multimeters and oscilloscopes that are completely specific to their stimulus, analysis, or measurement function. Because of their hard-coded function, these systems are more limited in their versatility than virtual instrumentation systems. The primary difference between 'natural' instrumentation and virtual instrumentation is the software component of a virtual instrument. The software enables complex and expensive equipment to be replaced by simpler and less expensive hardware; e.g. an analog to digital converter can act as a hardware complement of a virtual oscilloscope.

A synthetic instrument is a kind of virtual instrument that is purely software defined. A synthetic instrument performs a specific synthesis, analysis, or measurement function on completely generic hardware. Virtual instruments can still have measurement specific hardware, and tend to emphasize modular hardware approaches that facilitate this specificity. Hardware supporting synthetic instruments is by definition not specific to the measurement, nor is it necessarily (or usually) modular.

Commercially available technologies, such as the PC and the analogue to digital converter, have enabled virtual instrumentation to be frequently adopted.

Synthetic measurement has the benefit of maximising reuse of hardware as well as extending the useful life of the hardware.

Synthetic measurement requires a test system architecture comprising synthetic instrument modules with standardised interfaces to carry out the process of measurement.

The synthetic measurement test system is a reconfigureable system that includes a series of hardware modules with standardised interfaces to generate signals and make measurements using numerical algorithm processing software techniques.

What distinguishes the hardware modules to be synthetic is that they are utilised in making many different measurements by the application of different software modules rather than being specific hardware for specific measurements. However there may be more than one synthetic device in any given synthetic measurement system carrying out similar functions to meet the required application. For example two digitisers may be employed, one narrow band high dynamic and one wide band low dynamic.

The synthetic measurement approach is therefore based on classic system architecture where bespoke systems are constructed from mature products linked via standardised interfaces.

A major advantage of synthetic measurement systems is reuse through the application of modular software elements. If a new measurement is required then a new software module can implement this. No new hardware needs to be added, so the capital investment of the test system hardware has an extended life. The software configures the measurement by providing the information in the required format using data processing to provide signal generation, signal conditioning, signal conversion and signal analysis through the application of various algorithms. The software is therefore built on a standard hardware framework for signal interface conditioning, frequency conversion, data conversion and numerical processing.

Synthetic test systems applied to specific equipments can therefore respond more quickly to new measurement requirements. A new algorithm can simply be implemented in days where hardware modifications may take weeks to months to implement.

The flexibility of using various modulation schemes to provide measurements including same using say radar schemes to measure communications products opens up a whole new field of opportunities and applications with measurement times improved by many multiplication factors.

Provision of Synthetic Measurements can provide a virtual test capability to enable the following opportunities:

Fast test times using simultaneous/concurrent testing techniques by applying modulation based snapshot time domain/Fourier test methodologies;

Flexible/reconfigureable/future proof hardware investment to reduce delivery times and costs Wide band/wide range reusable facility based test systems to provide a wide range of applications from equipments to products across remote sensing and communications projects Open architecture to enable traditional, and new, test methods to co-exist with compatible standards such as LXI provides for instruments without panels so reducing volumes to less than a quarter of the original size According to the invention calibration is now synthetic to be exploited with many benefits. The electronic calibration unit is now a synthetic calibration standard electrical unit, which emulates a whole range of mechanical calibration standards by weighted database embedding data techniques to provide a complete standard in one unit, which now is better in performance than the individual mechanical standards.

There are many types of measurements that synthetic instruments can address in all the domains, for example frequency, time, power, vector and code.

Military projects can last up to 50 years whereas technology in products such as PCs can change every 18 months.

A "soft" approach, using techniques such as synthetic measurement can now bridge this mismatch, as software product cycles which can often double software complexity, can be as short as 12 months. The evolution of measurement capability must match the rate of increasing complexity of equipment in use. Support and testing needs to be related to equipment complexity, which can now be dominated by computing and software. Synthetic measurement also enables the use of customer traffic modulation schemes to be utilised to measure channel transfer functions performance. This has the advantage of making possible transparent testing with no disruption to normal operation of the communications system. The normal user of the communication system may even be unaware of the testing.

Synthetic measurement enables the use of a pilot signal referenced back to a source to be used as a master reference synthetic signal in a channel to provide very accurate relative band vector measurements over a remote link when used as a reference for other signals. This has the advantage of providing complete channel characterisation with embedded LO'S over a remote link for accurate and repeatable measurements.

The use of a pilot signal can also be applied as a band traffic detector by phase comparison with an external reference. This has the advantage of eliminating unknown signals from known signals within an identifiable channel band.

In a pulse time domain, synthetics can be applied to multiple equipment under test in parallel or to a single piece of equipment with multiple parallel paths with the advantage of not requiring any switches. This improves flexibility of access and speed of measurement.

This therefore has the benefit of providing multiple parallel-path device testing using a single signal source and single monitor port. In fact, based on circulator principles, a common bi-directional path could be used when matched to time latency path mapping. The principle here is to use a pulse signal system much like a radar pulse but over a communications link. The parallel device paths each have a different unique time latency, which can be designed for this purpose. The advantage is that because signal power splitting and combining is used no switching is required. This enhances speed of operation and, with no switches involved, is very reliable and repeatable.

When the measurement is synthetic and based on a pulse vector modulation scheme, it is possible to measure various parameters as a snapshot. This principle could be used in the digital domain as well as in the RF and microwave signal domains.

To determine the time reference, the initial pulse must be identified and the follow-on pulses detected and counted again, as with radar principles. The multiple pulse output from the device and the single pulse into the device need to be cross-correlated to identify the specific device involved with a specific response.

The same principle will apply to a single device with multiple parallel paths.

According to a further aspect of the invention, there is provided a remote testing system, comprising a control system; a device to be tested remote from the control system; and a test system local to the device, the test system being connectable to the device to perform device testing; the control system being arranged to establish a communications link with the test system; wherein the control system is configured to receive identification information associated with the device, to determine one or more tests to be applied to the device based on the identification information and to transmit test information defining the one or more tests to be applied to the device.

According to a still further aspect of the invention, there is provided a method of testing a device remotely from a control system, comprising establishing a communications link between the control system and a test system local to the device; receiving identification information for the device at the control system over the communications link; determining one or more tests to be applied to the device based on the identification information; transmitting test information defining the one or more tests to the test system; and running test software on the test system to apply the test information to the device.

BRIEF DESCRIPTION OF THE DRAWINGS

Embodiments of the invention will now be described by way of example with reference to the accompanying drawings, in which:—

DETAILED DESCRIPTION

The process of the invention can be as simple or as complex as required depending on the piece of equipment under inspection and the particular access to diagnostic services which is required to provide a solution. The process when fully automated, and when no expert personnel are involved in the decision making process, takes seconds.

Figure 1:
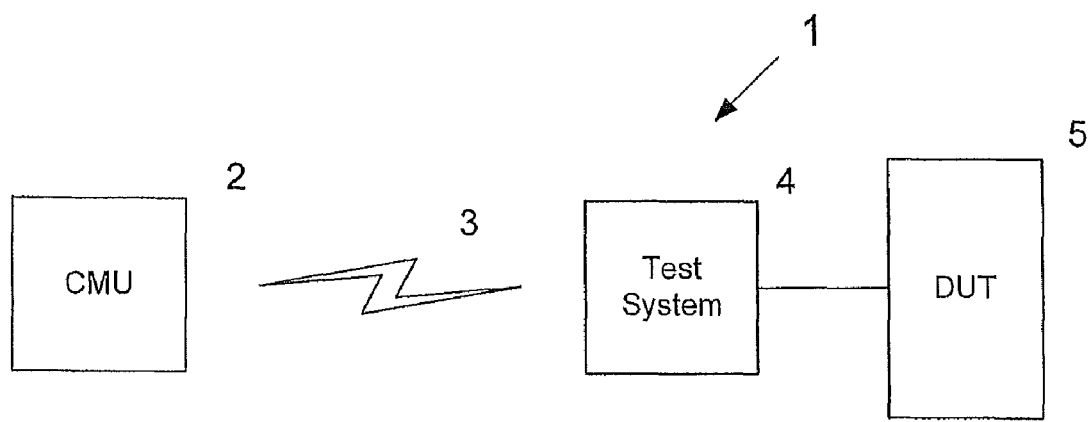
FIG. 1 illustrates a remote testing system according to an embodiment of the invention.

Referring to FIG. 1, a remote testing system 1, also referred to herein as the Remote Test Super System (RTSS), comprises a central server, referred to as a central maintenance unit (CMU) 2 connected over a communications link 3 to test equipment 4, also referred to herein as a test system. The test equipment 4 is in turn connected to the equipment or device being tested, referred to herein as a device under test (DUT) 5. The central maintenance unit is also referred to herein as the control system.

Figure 2:
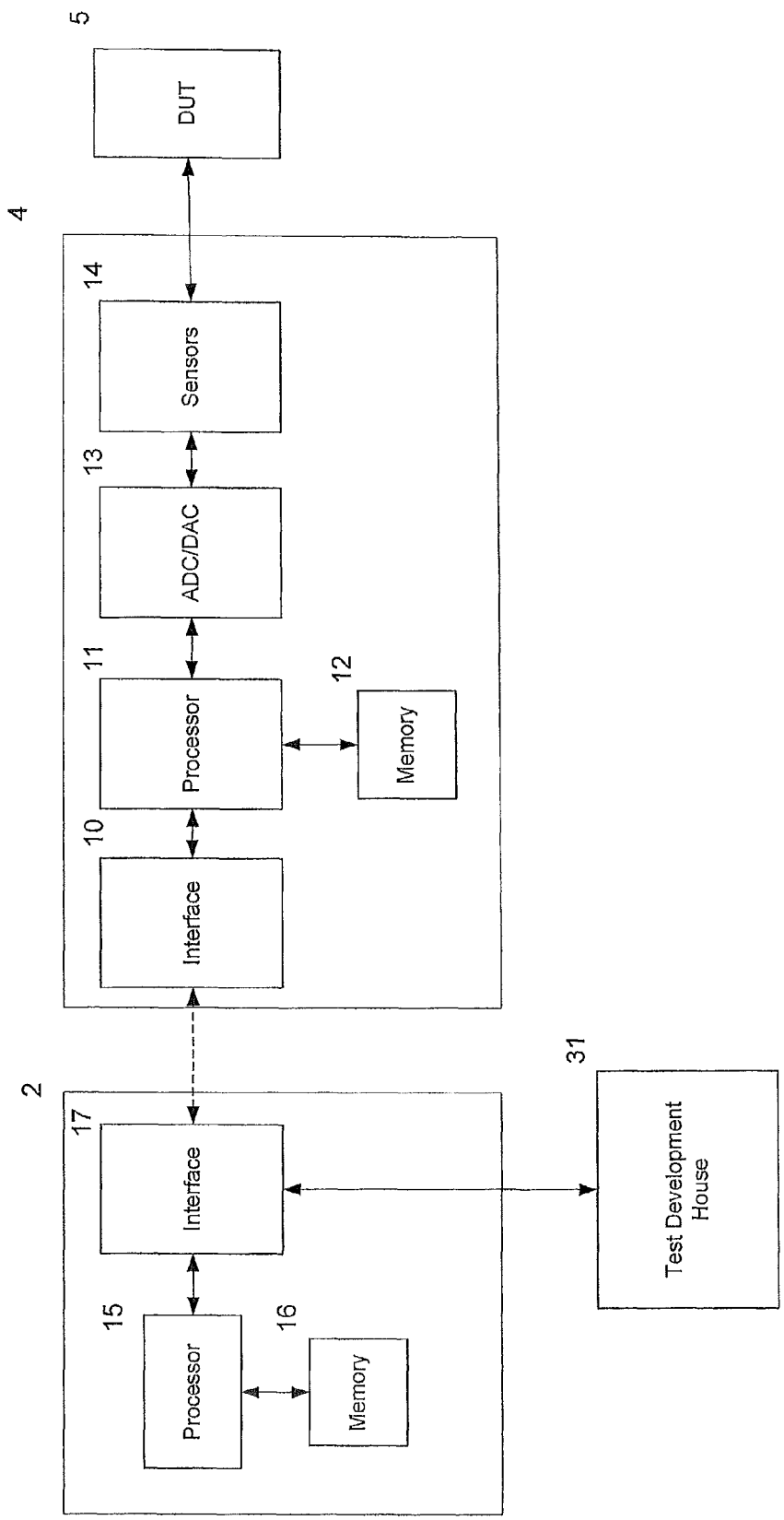
FIG. 2 illustrates the system of FIG. 1 in more detail.
Figure 3:
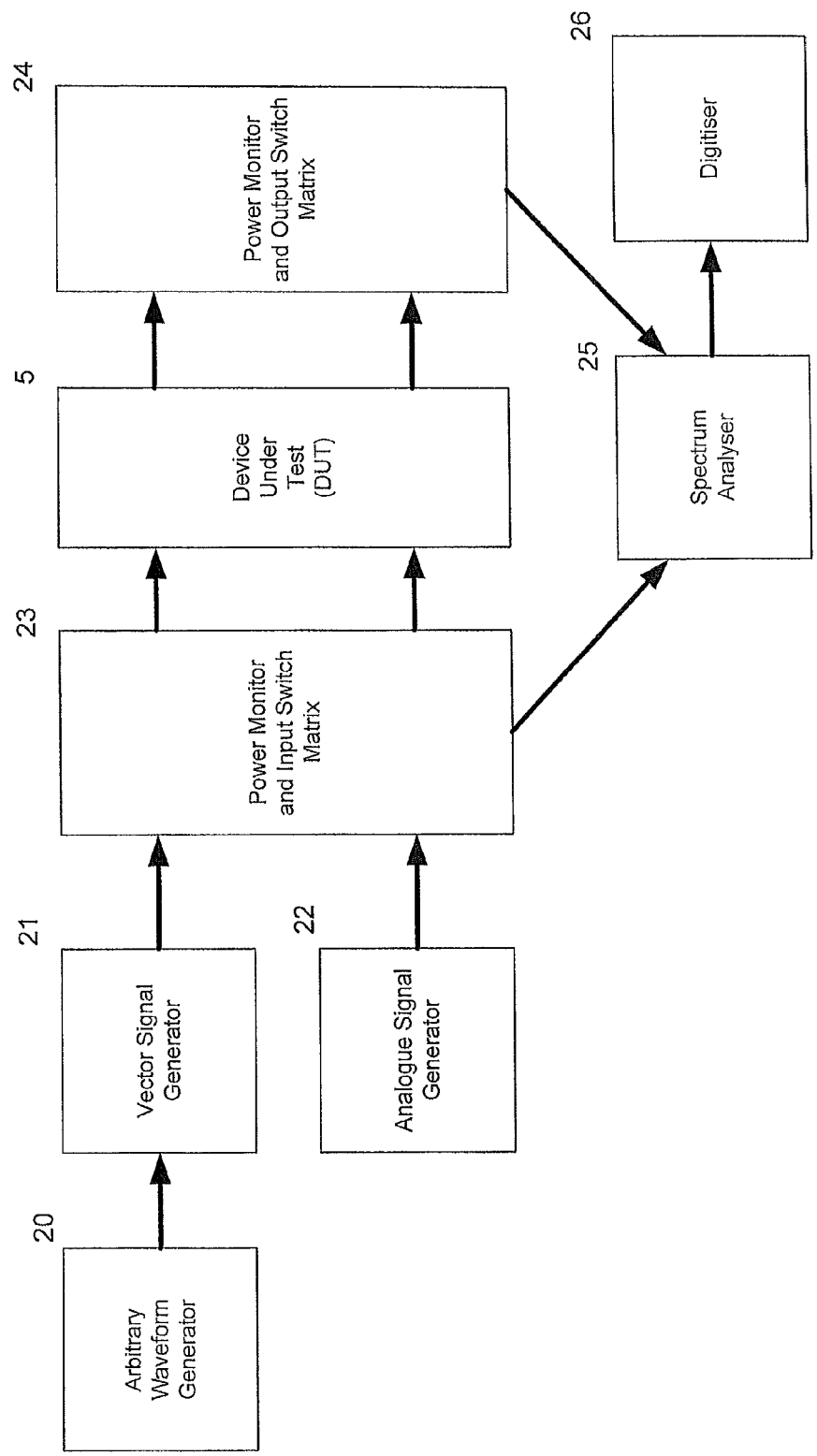
FIG. 3 is an example of a test system according to the invention.

Referring to FIG. 2, the test equipment 4 is a programmable apparatus that comprises a communications interface 10 for communicating with the CMU 2, a processor 11, memory 12, a plurality of fast analog-to-digital and digital-to-analog convertors 13 and a plurality of sensors 14, to enable the test equipment to output a wide range of test stimuli to the DUT 5 and to receive measurement data from the DUT 5. For example, the sensor array may include temperature, current and optical sensors, and the test equipment may also be capable of carrying out complex analysis of RF and other communication signals. For example, the test equipment is a vector signal analyser (VSA), a block diagram of which is shown in FIG. 3. The VSA includes an arbitrary waveform generator 20, a vector signal generator 21, an analogue signal generator 22, a power monitor and input switch matrix 23 for applying the signals to the DUT 5, a power monitor and output switch matrix 24 for receiving the outputs from the DUT 5, a spectrum analyser 25 and a digitiser 26. One example of a VSA is the Agilent 89600.

To enable the test equipment 4 to be configured for any particular DUT 5, the test equipment is programmable via test information received from the CMU 2.

The CMU 2 is a conventional computer programmed to communicate with the test system 4 and other systems, such as test development houses 31, that will be described in detail below. It comprises, for example, a processor 15, memory 16 and a communications interface 17, but it will be understood that it includes all of the components necessary for it to carry out its function, as described in detail below.

Figure 4:
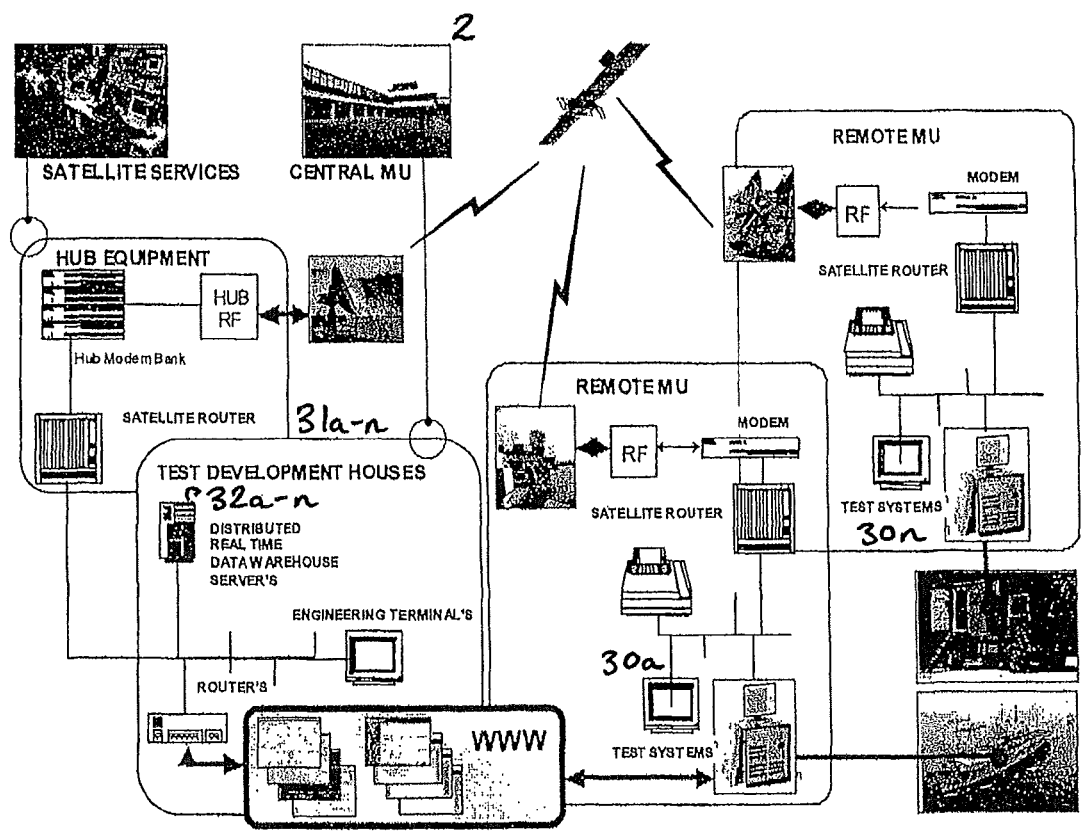
FIG. 4 is a diagram of a network incorporating a system according to the invention.
Figure 5:
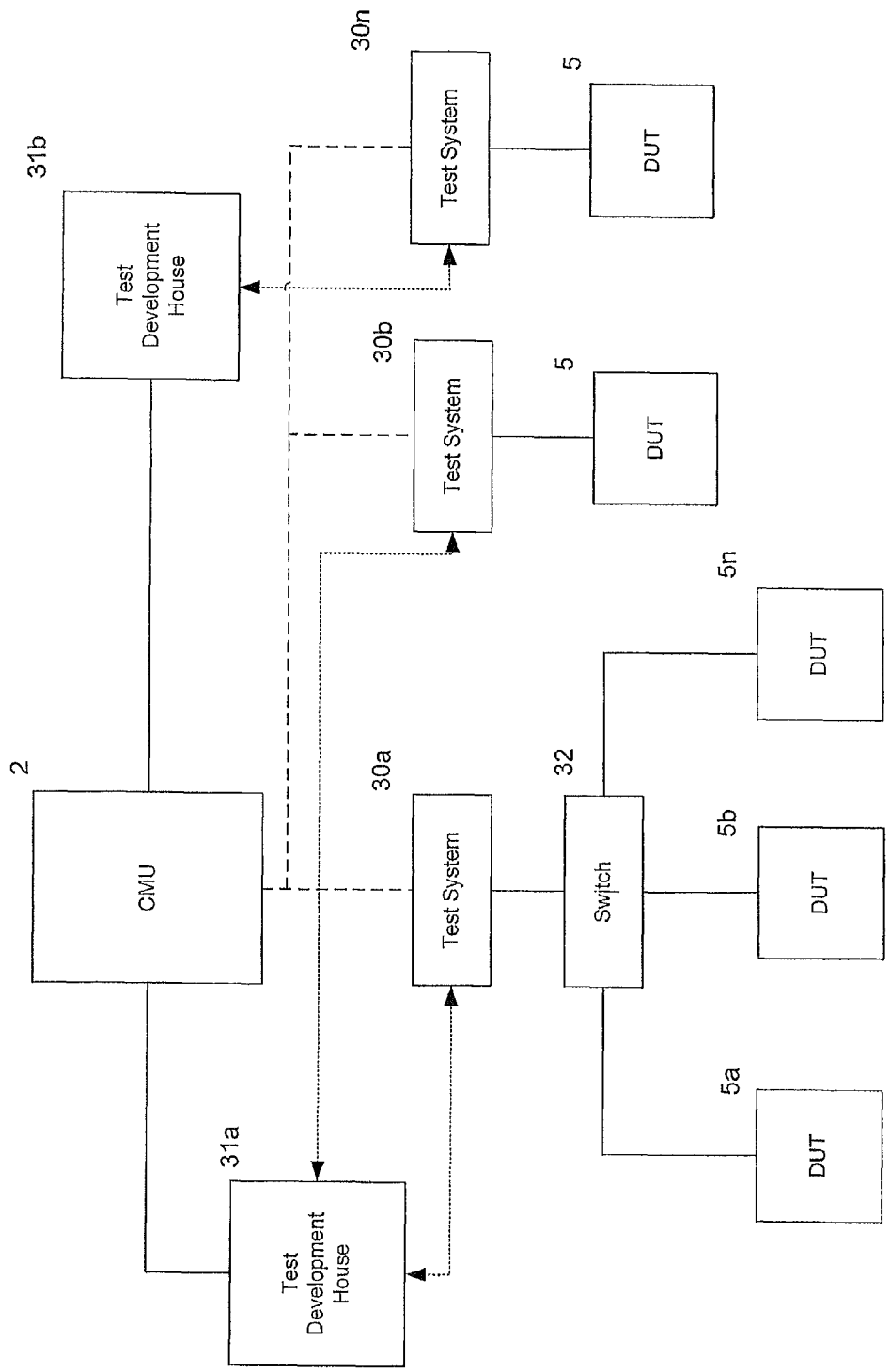
FIG. 5 illustrates a remote testing system according to an embodiment of the invention.

FIGS. 4 and 5 illustrate a system according to embodiments of the invention that can allow remote testing over a wide area, including globally.

Referring to FIG. 4, a CMU 2 is connected to a plurality of test systems 30a-n and to a plurality of distributed test development houses 31a-n. Each test development house maintains a real time data warehouse 32a-n which stores information about products that are specific to that test development house. For example, a test development house 31a-n may maintain information about all the products for a particular company. The information is maintained in the form of a device model for each product/device.

The CMU 2 may also maintain information about the test system 30a-n, or this information may be downloaded from the test system itself, in the form of a test system model. By combining the device model for the DUT with the test system model for the test system, an overall system model can be established, which may be associated with particular test information, such as appropriate testing strategies and expected responses to application of those strategies. For example, the system model can provide a theoretical output response to a particular stimulus, which takes into account both the way in which that stimulus is generated by the test system, and the response of the device to that stimulus.

In addition, where the device under test is part of a larger installation, the overall system model may also take into account device models for all of the devices in the installation, and their interconnections.

The respective test systems 30a-n may be connected to various devices under test DUT. In one example of the invention, all the test systems are the same, but are connected to a wide variety of different types of device under test.

FIG. 5 illustrates that a plurality of DUTs 5a-n can be connected to a single test system 30a via a switch 32. Information regarding which of the DUTs 5a-n is to be tested can be sent to the test system 30a from the CMU. In an alternative configuration, a time division multiplex arrangement is used for testing the various devices, so obviating the need for a switch. FIG. 5 also illustrates different test development houses 31a, 31b being responsible for different sets of DUTs.

Figure 6:
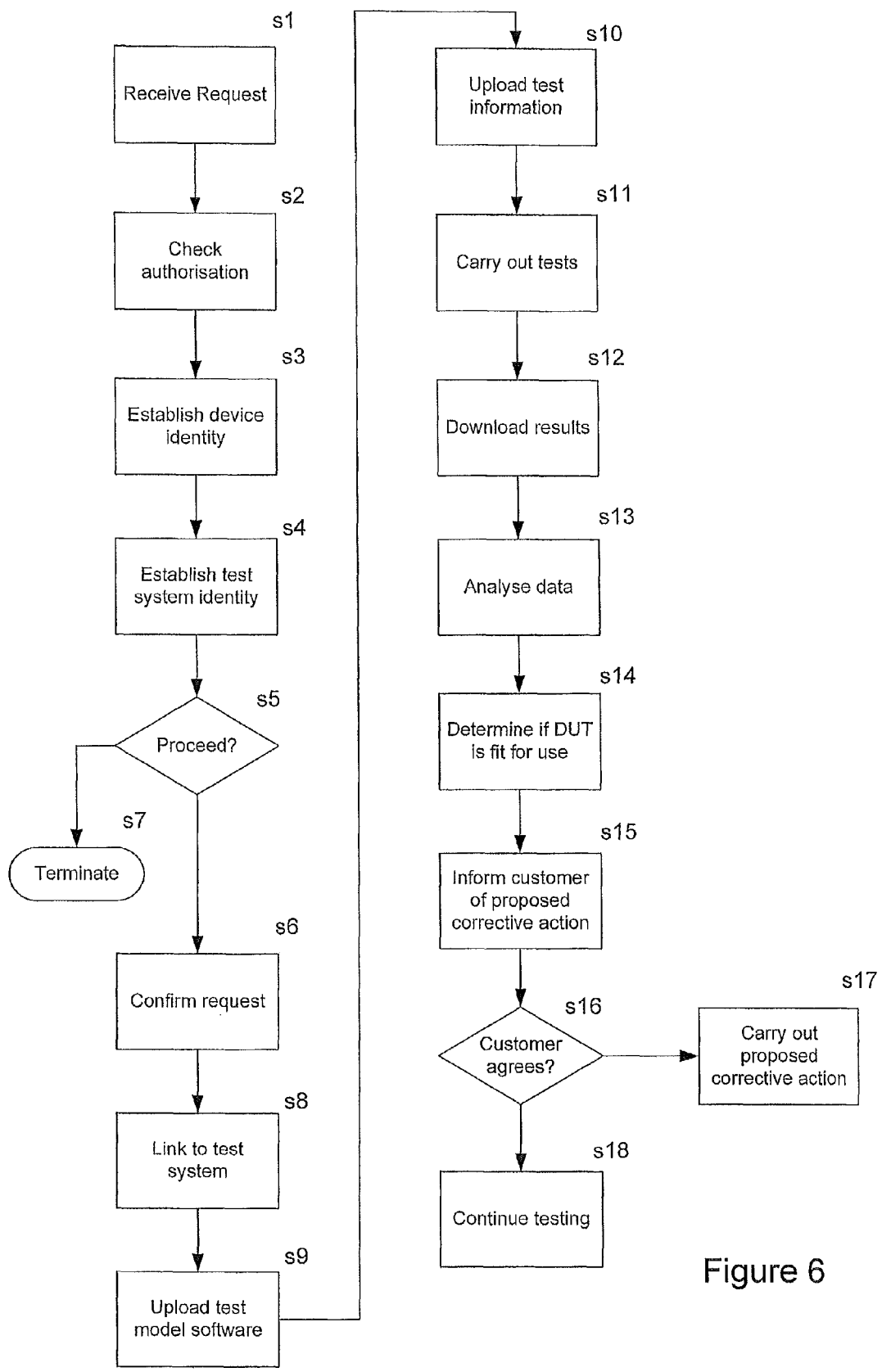
FIG. 6 illustrates a remote testing system process according to the invention.

FIG. 6 illustrates a remote testing system process according to the invention. In a first step (s1), the CMU receives a request via a communication link from a user or customer at a remote location, usually where the DUT is located, to carry out a routine equipment inspection/test or to find a fault in the equipment for replacement or repair.

The CMU establishes the authorisation of the customer (step s2).

The CMU then establishes the identity of the DUT by information exchange between the CMU, the DUT and a data warehouse for a test development house, as necessary (step s3). The identity includes a full data set on the DUT, as well as the environment in which it is currently located together with data for any available logistical support for the DUT. The CMU also establishes the identity of the test system in a similar way (step s4).

With the customer and equipment identity established, the CMU determines whether to proceed (step s5). This could be on any suitable basis, eg. the capability of the system or the level or validity of a particular support contract. If the decision is to proceed, the customer is informed that his request has been confirmed (step s6). If not, the procedure terminates with a suitable message to the customer (step s7).

The CMU then establishes a remote link to the test system (step s8). Based on the customer's request, for example the device to be tested and the type of test to be performed, the CMU instructs the data warehouse of the test development house to upload test model software for the specific DUT to the test system 30a (step s9). The test model software will include information such as the DUT specification, theoretical functional performance, logistical information, lessons learned from previous testing, fault and performance history and up-to-date data, based on the device model held in the data warehouse.

The CMU then uploads test information to the test system 30a (step s10). The test information specifies the tests that are to be performed on the DUT. In other words, the test information configures the test system into a synthetic instrument that will carry out specified measurements on the DUT. The test information includes the measurement and signal generation algorithms that are to be run on the test system and applied to the DUT, as well as the DUT configuration control & simulation provision to be applied to the DUT.

The test system carries out the tests on the DUT (step s11) based on the software provided by the CMU/data warehouses and downloads the results to the CMU (step s12).

The CMU accesses information held in relational databases in at least one data warehouse to perform analysis on the test results data in, or nearly in, real time (step s13). For example, where a system model has been established by combining the device model with a test system model, the measured results of applying a particular test can be compared with the theoretical results of applying the test to the system model.

The CMU determines, from the analysis, if the DUT is fit for continued use, i.e. 'go' or 'no go' (step s14). If the 'no go' condition also provides an indication of the fault found, the customer is informed of proposed corrective action automatically (step s15).

If the customer agrees to the proposed corrective action, either at the time or by prior authorisation (step s16), then this is carried out by the CMU or TDH or instructions for manual corrective action are issued by the CMU (step s17).

If the corrective action is not identified or not acceptable to the customer, then the testing/diagnosis process may continue (step s18) as described in detail below.

Either at the CMU, or at a different location via the Internet, an expert with appropriate security access is then given access to the services of the real time data warehouse, the TDH and the Internet and/or satellite network from anywhere to anywhere, to include verbal, visual and two-way communications capability.

If the no go condition provides an inconclusive fault found identity, the 4th line expert is brought in via web access to overview the test analysis and use the CMU tools of data warehousing to go around the loop again to inform the customer of the proposed corrective action.

With the expert authorised, a transmission link between the support station and the equipment via the internet including satellites if required is established using secure protocols.

The expert now has the means of interrogating the equipment for information concerning its operation from anywhere to anywhere globally.

Using the services of the CMU and access to the customer at the equipment the expert can form a diagnosis about the operation of the equipment.

If the customer agrees to corrective action suggested by the expert, this is carried out.

If the customer does not agree, 2 way communications are made available between the customer and the expert to include visual inspection of the equipment remotely, by the expert, and reference to the CMU if necessary. The customer's agreed corrective action of maintenance, repair or continued operation through reprogramming as required can then be implemented.

The remote service link between the CMU, expert and the customer is then terminated with the mutual agreement of the service provider and the customer.

The solution is recorded for lessons learned for use on equipment to be tested in the future.

Embodiments of the invention have so far been described as requiring a separate test system which is used to link to the DUT. The test system is connected to a central control/maintenance system via a remote communications link, over which test programs are downloaded to provide a synthetic test capability to the test system. However, various alternative embodiments are possible, as described in the example scenarios in more detail below.

1. An existing DUT is linked to local test equipment in a conventional way. This means that existing devices do not have to be modified. Although the linking interface will be known the test equipment will be different, according to the invention, as it will have synthetic capability to assist in enabling remote testing to be carried out. The test equipment will have the ability to be remotely activated by uploading the test model software and data. The test is then carried out and the results are downloaded remotely from the test equipment and then analysed at the CMU. This example thus enables standard equipment to be linked to the most up-to-date synthetic testing means, remote from the DUT, via an on-site test interface specific to the DUT.

2. The DUT is adapted to provide a standard test link to generic local test equipment which is then connectable to synthetic test equipment via satellite. This means that generic, off the shelf, test equipment including the interfaces can be employed with no bespoke hardware requirements. This arrangement is thus more cost effective.

3. This example is similar to example 2, above, but with the addition that normally within the DUT there is no test capability apart from hardware infrastructure to host that capability. Test facilities are made available to the DUT by remote activation, via the Internet & or satellite, by uploading test model software and data into the equipment. The test is then carried out, the results are downloaded remotely and then analysed, usually at the CMU. This has security advantages as the performance parameters of the equipment are not permanently contained in it or to attached test equipment but only temporarily during the test.

4. This example is similar to example 3 but with the feature that only test configurations are uploaded and raw data is downloaded. The measurement does not therefore have to occur at the DUT but can be at the CMU. The measurement performance model is contained in the CMU where the virtual measurement takes place on the raw data. In this way all parameters are secure as these are held in the CMU and in data warehouses. The performance information for the DUT is thus never released into the field. Also, if required, the DUT can be wiped clean of data so rendering it inoperable if it cannot be repaired. There is also greater processing power at the CMU so diagnosis is smarter and quicker.

5. This example is similar to example 4 but with hardware for the synthetic testing being built into the DUT to allow virtual built in self test. This has the advantage of no external test equipment being required in the field but only the communication means, for the DUT, to the CMU. Thus no physical performance indicators are available even from test hardware. This self-test capability will also provide the best fault-found ratio as the CMU has direct access to the DUT.

Remote testing according to the invention is cognitive in that the test can be dynamically adaptive, utilising synthetic measurement, the means for which can be uploaded and downloaded remotely so constantly providing the latest diagnostic techniques. This means that the method of testing is not determined by the date of the hardware delivery but can evolve as synthetic measurement techniques evolve. The testing can also evolve as the history of the equipment while in service provides both fault-found and general performance history in the operational environment to extend a model of the product. With equipment currently in service for up to 50 years, the use of synthetic measurement, combined with cognitive testing, provides for support of generations of equipment upgrades without having to correspondingly update support equipment.

Figure 7:
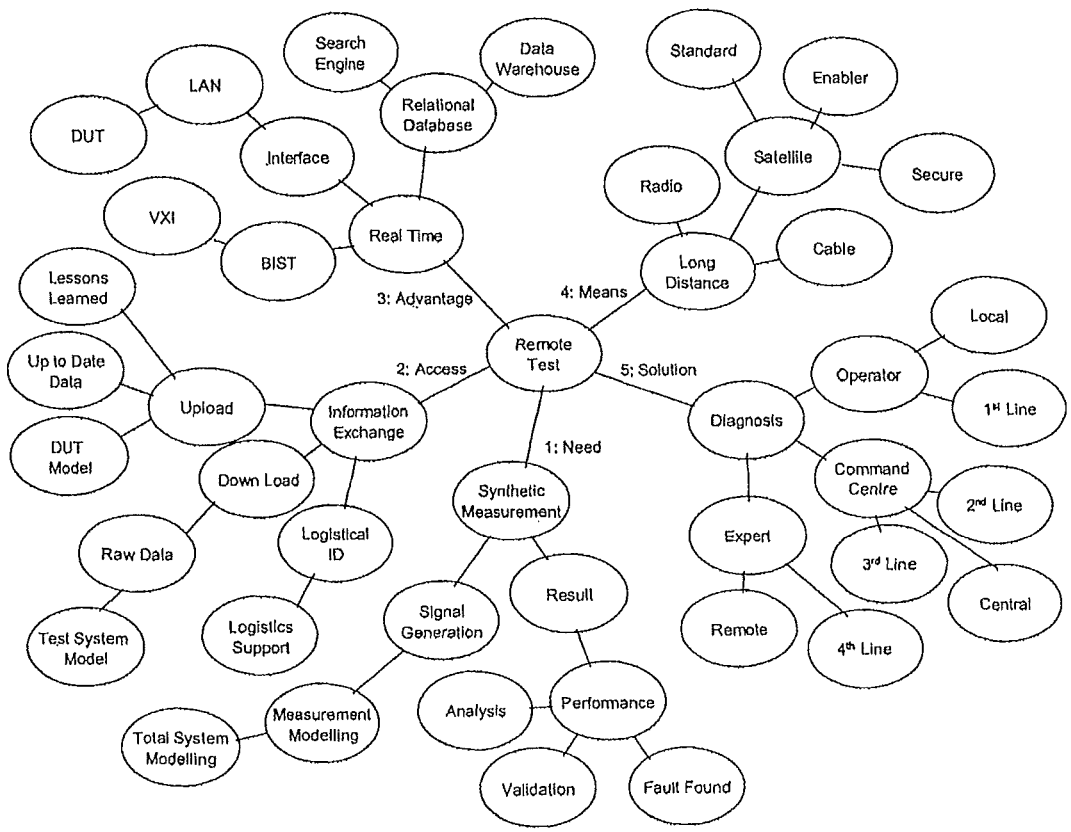
FIG. 7 is a mind map of concepts and flow paths used in the system of the invention.

The cognitive system is illustrated in the invention map as shown in FIG. 7

The interrelationships provided by the invention enable a total end-to-end capability as the means to meet the primary need of "Fault Found" to maximise the continuous use of the DUT.

This memory map illustrates some of the many associations that make the RTSS application a solution provider.

1: The 'Need' is to carry out a measurement to find a fault in the DUT for replacement or repair.

2: The 'Access' via upload and down load is provided by information exchange using Information Technology Informatics science principles of modelling, simulation and real world data of the DUT and modelling, simulation and real world data of the Test System, together with logistical information both local and remote to provide a total system model.
3: The 'Advantage' is provided by real time responses with technologies, which provide instant access to mass information using relational databases with search principles linked to multiple distributed data warehouses.
4: The 'Means' is predominately provided by the secure Satellite communication network.
5: The 'Solution' is resolved through the correct diagnosis made possible by network access to local, central and expert personnel.

Figure 8:
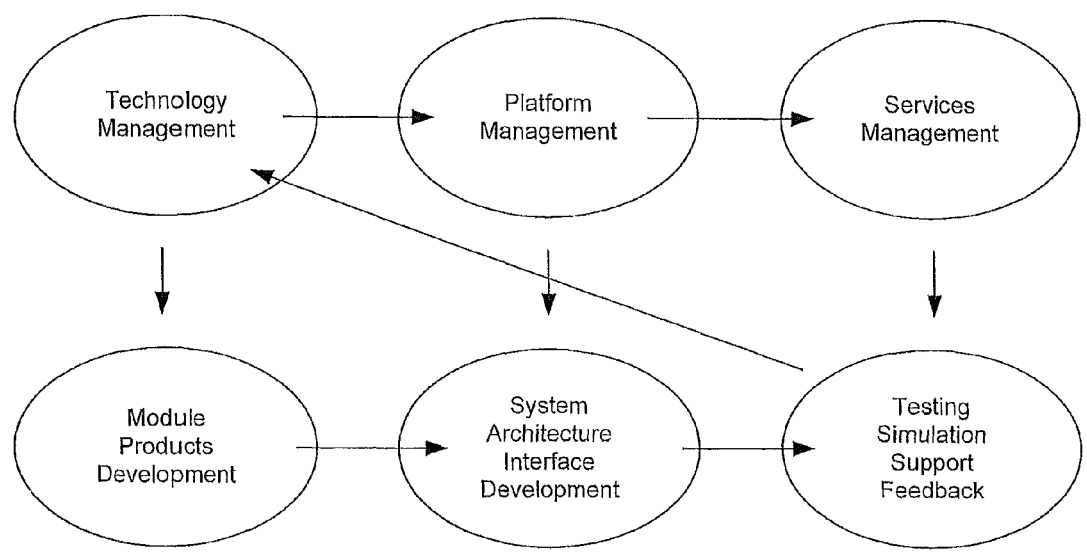
FIG. 8 is a diagram of a system structure of the invention.

For the end-to-end process of the invention to be realised in a continuous long-term sustainable manner the Super System concept is employed as illustrated in FIG. 8.

This super system structure supports a continuous life cycle process through continuous innovation of applications as well as field support of product DUT'S. The super system is an integrated structured mature network architecture which supports innovative products within its structure through the application of interfaces maintained by agreed open standards.

The invention in this respect balances the need for flexibility to encourage innovation in "Module products development (both Test Systems & DUT)" by employing "Technology Management" while at the same time minimising the risk to the Super System by retaining a mature Structured Architecture using "Platform Management". The "Platform management" maintains the architecture by defining the standards for "Systems Architecture Interfaces development". The "Service Management" maintains the structure through "Testing, Simulation and Support, providing feedback" for Change management through lessons learned to maintain innovation while at the same time minimising risk.

The DUT being provided with compatible interfaces with the invention in this super system structured manner makes remote Test more effective providing for greater DUT sustainability over time.

The needs of test analysis are met by real time data warehouses. This is preferably a relational database which may be part of a secure information system and may have the following attributes:
 web based providing access from any location to any location for control, monitoring and analysis of equipment;
 Provides a fault/performance history record;
 Defines the gathering, manipulating, storing, retrieval and classifying of recorded information;
 Does not duplicate information and thus provides instant access to the exact information requested;
 Avoids errors of duplication of information by storing information in one location in a precise relational manner;
 Compensates when under stress by providing cognitive information data handling by using clear structured information presentation techniques;
 Provides for hierarchical secure project/product ID access;
 Enables real time test management based on criteria selected from: metrics, resources, logistics, test methods and analysis.

Information flow associated with measurements taken from the equipment under test is facilitated by the use of data warehousing.

With testing of equipment a lot of time is wasted trying to find the correct data for that equipment in databases and verifying its status, quality and traceability. Data warehousing, with its organisational and sorting ability, removes this difficulty, making searching as simple as with a standard search engine, with instant access to all the data warehouse information required.

Data warehousing allows for near real time results and performance analysis handling. Data warehousing therefore operates as a test management system and a repair management system minimising mean time to repair. Data warehousing also operates to optimise the use of equipment/assets, calibration and maintenance cycles through access to optimised product information so maximising mean time between failures.

The CMU, which is likely to be a data warehouse, may provide test storage of the test sequencing. It may contain the following features:
 Selection of test runs according to predefined projects, equipment types, etc.;
 Automatic extraction of test results from TestStand test sequences;
 Writing test results in a pre-defined open standards interface format to a test results storage database;
 Storage of results per project.

The CMU may also provide central management of a test data management system. It may contain the following features:
 Web interface to allow cross-site access to manage data;
 Co-ordination and management of data storage;
 Management of the following: the test plan; the equipment; any on-site test facility for the equipment; test equipment; a supply chain for the equipment; human resources, for example users and operators; projects involving equipment; master authentication and authorisation functionality for all other services; management and co-ordination of per-project test results storage databases.

The CMU may also provide post acquisition analysis and reporting on test data. It may contain the following features: a web interface to allow cross-site access to test analysis data; more generalised production operations performance analysis; product evaluation analysis, and import of locally stored results into main project databases.

The LAN interface standard may be used for the invention, for interfacing different components. A derivative of LAN interfaces is LAN based instruments and standards such as LXI. All major suppliers of test instruments now endorse the LXI standard as they are part of the LXI members consortium. LXI is a cost effective modular platform with real time LAN interface enhancements. LXI Instruments are web based which is ideal for remote testing purposes. They also have no front panels which can lead to a considerable saving of space and to increased flexibility.

Figure 9:
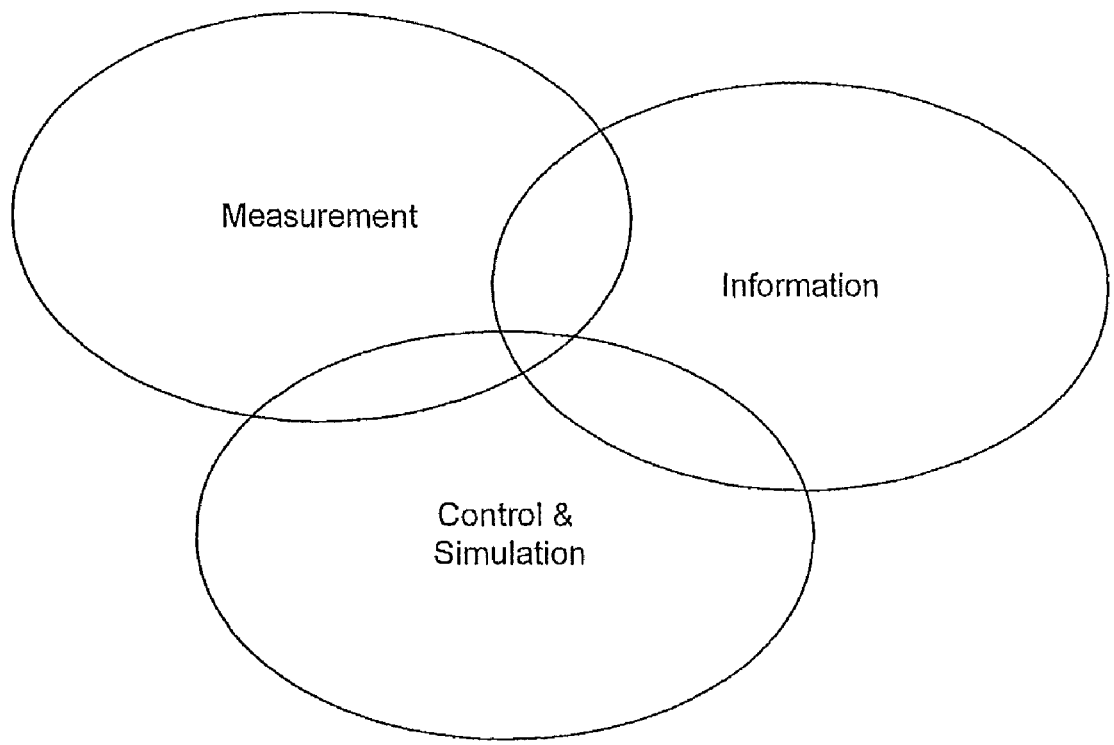
FIG. 9 is a diagram of an automated test system according to the invention.

Referring to FIG. 9, the system of the invention may consist of a system of three systems: Information—Logistics; Control/Simulation—Interfacing. and Measurement—Validation.

The Information System provides the informatics; all the information data parameters for test including the equipment logistics, the test system logistics, the equipment performance, calibration, test, configuration, results, analysis, verification and validation parameters.

The Control and Simulation System provides the control and monitoring or commands and telemetry of the equipment as well as the simulation of the equipment interfacing and aspects of the equipment simulation.

The Measurement System provides the measurement capability based on international standards to measure the equipment by providing compatible stimulus and monitoring signal generation and analysis.

Synthetic measurement lends itself to the system of systems approach as clear standard interfaces can be defined for this functional application to provide a major building block element to work within a stable architecture. Referring to FIG. 3, the test system hardware for the synthetic measurements is based on Vector Signal Analysis (VSA).

Synthetic measurements are preferred as they provide a number of strategic advantages in terms of investment, delivery, capability and capital hardware re use.

The principles of the VSA are summarised as follows: VSA based flexible test system architecture provides the capability for using synthetic measurements with both traditional and new hardware; VSA may be used to undertake measurements not previously possible by conventional means; time saved with the faster measurements has enabled both faster delivery times and the requirement for less test systems investment.

Provision of Synthetic Measurements can provide a virtual test capability to enable the following:

Fast test times using Simultaneous/Concurrent Testing Techniques by applying Modulation based Snapshot Time Domain/Fourier Test Methodologies Flexible/Reconfigureable/Future Proof hardware investment to reduce Delivery Times and Costs Wide Band/Wide Range Reusable Facility Based Test Systems to provide a wide range of applications from equipments to Products across remote sensing and communications projects Open Architecture to enable Traditional, and New, Test Methods developments to co-exist Modelled referenced validation & verification capability by providing compatibility and use of modelling tools Minimal Foot Print Test Systems using LXI compatible standard approach provides for instruments without panels so reducing volumes in less than a quarter of the original size Meets the needs of increased complexity, High Speed Test, Results Processing and information access by provision of links to Test Data Management Systems International Automated Test Systems Standards compatibility particularly with interfacing enabling wide marketable products delivery capability Calibration has now become synthetic to be exploited with many benefits.

The Electronic Calibration unit is now a synthetic calibration standard electrical unit, which emulates a whole range of mechanical Calibration standards by weighted database embedding data techniques to provide a complete standard in one unit which now is better in performance than the individual mechanical standards There are many types of measurements that a Synthetic Measurement Library (SML) can address in all the domains of example Frequency, Time, Power, Vector and Code.

The candidates for Synthetics are infinite when applied with various modulation schemes.

There are many measurements methods that will benefit from this approach Synthetic measurements based on modulated signals provide for greater flexibility of application using for example communication schemes such as QAM or RADAR signal such as Chirp.

As the measurements are snapshot in nature then test times are improved with different types of simultaneous results test domains presented at the same time.

The configuration shown in FIG. 3 provides for the use of simultaneous time, frequency and modulation domain measurements with broadband and broad-spectrum capability. A mix of new synthetic and traditional instruments capability is available.

This system provides the mix of narrow band with high dynamic range capability traditional harmonics and spurs measurements as well as wide band with good dynamic range capability for modulation measurements.

There is potential for a merging of the signal generation as well as signal detection and analysis into one unit. The purpose of modelling is to provide a measurement method, which will combine with the equipment to provide a total model of the test system and the equipment. According to the invention, design modelling packages will combine with test systems equipment to provide synergy between test designs and equipment designs to improve the overall design verification process. This reduces both timescales and risk with the provision of greater virtual performance detail.

A virtual product for example provides improved modelling reference design capabilities as well as shorter timescales and increased flexibility as this removes the need for a physical validation product to be built and validated.

Test design modelling allows virtual product testing, to validate design principles. The virtual test measurements can be replaced by real measurements as the real hardware arrives so that an iterative analysis to performance can be made. This reduces analysis time as well as being more robust to changes with greater flexibility. This also has the added benefit of seeing how real element performance affects the overall system before the overall system build is completed. This model of the DUT, based now on real data can then be used post delivery of the equipment for support, maintenance and fault found activity. The model can then be extended on the basis of lessons learned in the field of operations from the fault/performance history.

A total system model can therefore be determined from the test system model and the equipment model to provide for operational simulations. This can incorporate uncertainty analysis for various scenarios from which can be determined the full functional tests and the performance tests. From this validation and verification performance analysis reference principles can be derived for qualification of the product as well as maintenance and support of the product. Modelling of the fault/performance history can also predict trends for preventative maintenance and support purposes. A competence centre for the system of the invention must have a cost effective functional activity base, to deliver to the customer needs. It must also have the technical capability to meet the customer's product test and maintenance requirements. A centre of competence is required with the critical mass to provide the necessary skills, technology and processes necessary to meet the performance needs.

Figure 10:
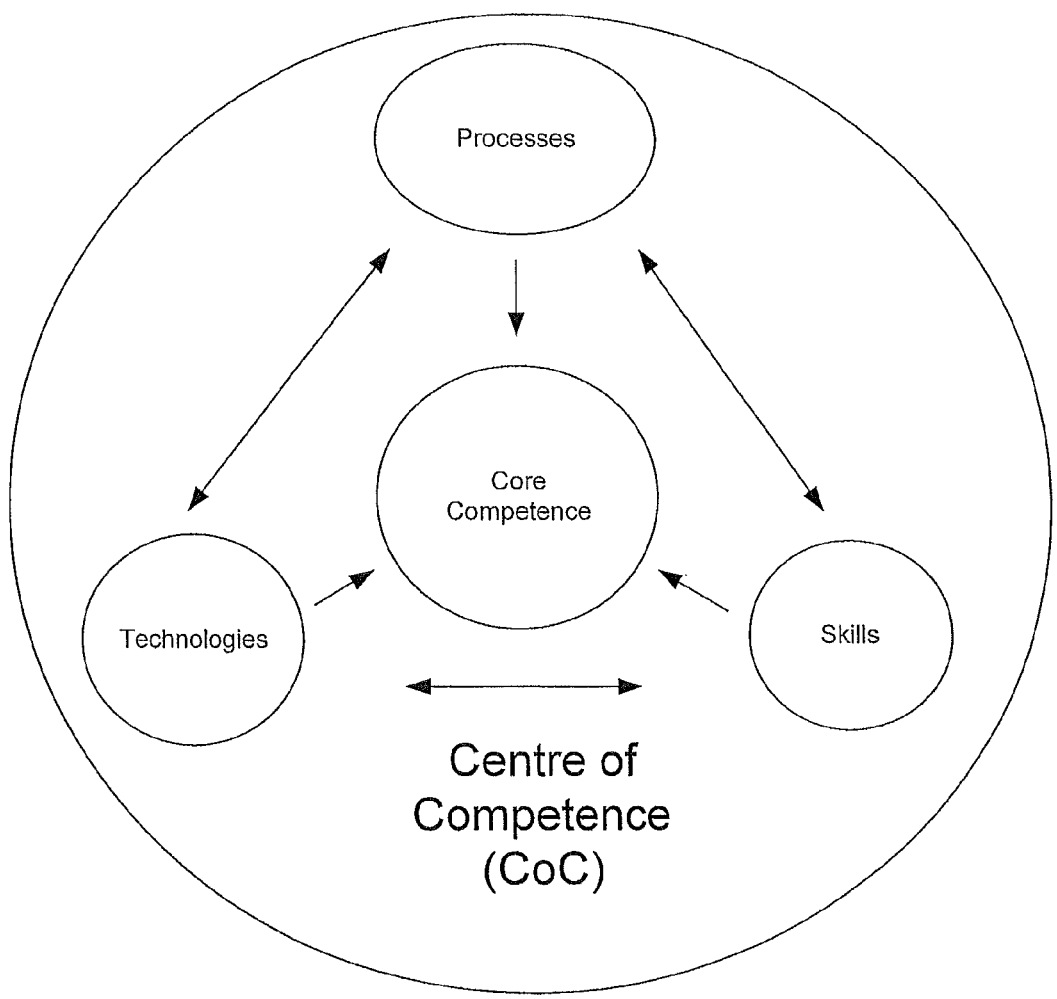
FIG. 10 is a diagram of competencies associated with a central maintenance unit according to the invention.
Figure 11:
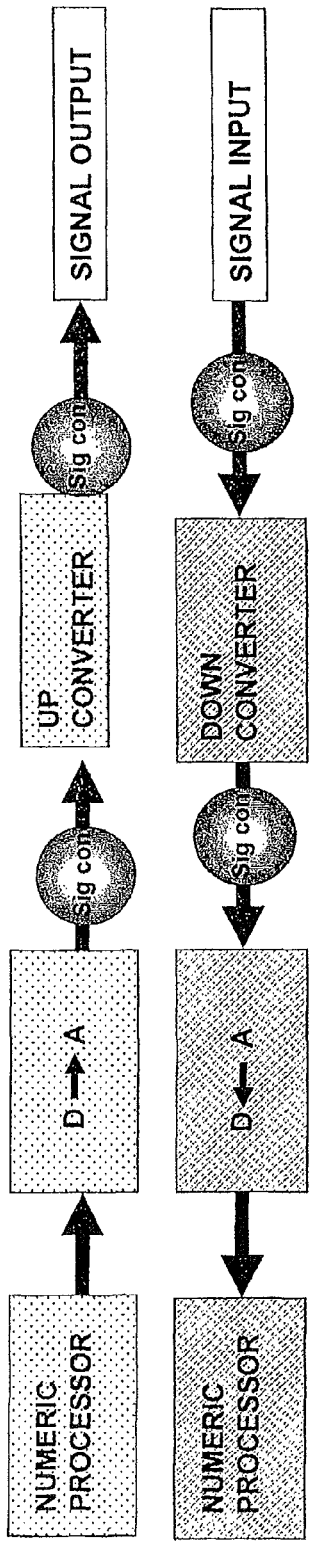
FIG. 11 is a diagram showing the main functional blocks of synthetic testing for electronic equipment.

Referring to FIG. 10, it is proposed that a Central Maintenance Unit (CMU) be the competence centre for support and maintenance purposes. The CMU has service information access capabilities as an enabler for a test network. This service will include video, voice and data access to/from the CMU within a, preferably global, network.

To be most effective test support needs to be present at the design stage as well as the build and maintenance operational stage to provide the total capability in the necessary history of the DUT.

Test support needs to provide information right though from bid to design analysis and product support. At the bid phase of projects Test System Design needs to address the application philosophy of design for test of the DUT Product as well as the Test System Products to be used in the application and the analysis tools framework to enable successful verification of the DUT product to be realised. Support requirements may also be included in the product design data to provide total cost of ownership.

Test Development Houses (TDH) each with their own data warehouse(s) may be responsible, according to the invention, for their own products. These data warehouses may be linked, via standardised interfaces, to the CMU.

The TDHs may provide the expert knowledge and the equipment "4th line" back up expert assistance when needed.

The TDHs provide test capabilities information and modelling based on the following:

Test Software: Test executive system; product management system; information data warehouse; test system modelling; product system modelling; communication systems modelling; logistics system modelling; software standards;

Test Hardware: Web based instruments; generic OEMs product; bespoke test systems product; product test interface units; hardware system standards;

Test Verification: traditional & synthetic measurements; analysis and results validation; fault found diagnostics.

Referring to FIG. 4, the Central Maintenance Unit (CMU) provides the command and control central hub of the communications network of the system of the invention and the central knowledge base of the test system and the products for 3rd line and 2nd line maintenance expert assistance for field service support activities.

The CMU has access to the TDHs data warehouses via the real time relational database system and the global network via satellite and the Internet.

Test data management is based on the Real Time Data Warehouse (RTDW) features with capabilities as follows:

Access to the system and modelling software and data of the TDH data warehouses

TDH data access to the product build state including specifications and diagrams for download Web based capabilities and services Video, voice and data access services High speed real time performance data search engines and drill down capabilities Results, performance, trend, traceability and product logistics & tracking data Productivity and efficiency monitoring of both test systems and equipment Fault and performance history of both the test systems and equipment Asset management, LRU, RMU and test equipment movement tracking Remote software and data upload to field equipment and test system assets for equipment configuration and test set up Remote software and data download from field equipment and test system assets for equipment telemetry and test results.

The satellite network includes: Secure satellite control link

Internet protocol

Point-to-Point protocol

Broadcast

Asynchronous transfer mode

Circuit switched and devolved

Support legacy terminals

The satellite global network provides access to a seamless secure communications infrastructure operating services to link the, usually remote, equipment to the CMU. This communications network therefore has the ability augmented by the Internet and satellite communications to put an expert anywhere in the world with 4th line information access from the CMU with its knowledge based information systems into contact with the remote equipment. This effectively provides 4th line capabilities at the front line in real time with the latest up to date information. Examples of further fields in which the invention could be used are as follows:—space operations, whether Civil or Military to include Satellites, space stations, space platforms, space warehouses and other space vehicles; air theatre operations, whether Civil or Military including aircraft, airships and un-manned Aerial Vehicles; water based Platform operations, whether Civil or Military, and including all water borne craft, submersible vehicles and static rigs whether floating or otherwise; land based field operations, whether Civil or Military, including vehicles, weapons, general electronic equipment, buildings, remote unmanned stations; remote training; reverse access to data processing when a local capability is limited, to provide the necessary data processing power at a remote location; logistical testing at remote weather stations; remote medical applications including synthetic instruments, reconfigurable mobile hospitals and surgeries; remote environmental systems, including irrigation systems; remote Rail network safety test monitoring and maintenance; remote sound monitoring systems to detect fault signatures as a warning maintenance limit with feedback to operators for corrective action in real time as necessary; remote Security systems for monitoring, operation and maintenance; remote building and asset monitoring to include building maintenance and management systems; product service support and tracking, covering continuous product life history monitoring; remote continuous systems monitoring, e.g. such as required for Aircraft Jet engine maintenance; remote takeover of a management system for equipment to supplement diagnostics for key performance indicators; provision of remote testing and maintenance for scientific equipment such as telescopes; oil companies assets such as platforms, rigs and pipelines to meet maintenance and logistical requirements; data provision and analysis for catastrophe support functions; remote medical science and assistance requiring expert assistance and access to expert systems and reconfigurable equipment and instrumentation; remote vehicle maintenance service, eg. motoring organisations service; real time traffic management systems; real time information systems with statistical analysis and diagnostics capability requirements such as, finance, banking, financial markets, government and charity organisations.

In summary, embodiments of the invention provide a system wherein test coverage and expert access may truly be a remote global coverage anywhere in the world augmented by communications access via the Internet and satellites with field terminals to cover true remote deployment locations in demanding environments. wherein experts anywhere in the world may have remote viewing and command capability in real time with remote access anywhere else in the world to provide correlated expert information to assist in the decision making diagnostic process.

The system may provide a real time remote test capability, a real time data and result processing capability, a real time relational database, search engine and data warehousing for real time data access on DUT products, performance data, library data, logistical data, historical data, test models, DUT models and analysis providing a continuous process operation for diagnostics with the capability of handling large amounts of complex data so making things possible that would not be practical using traditional methods in a workable response timeframe.

The system may provide for a differential advantage of a new practical timeframe for solutions implementation based on informed decisions providing for new opportunities for solutions provision as a service to give customer advantage.

The system may be reconfigureable remotely with new personalities of capability augmented by synthetic measurement and calibration upload and downloads to modify the performance and function of the system as synthetic instrumentation to tailor it to the specific requirements of the DUT.

The system may provide a cognitive capability to adapt to provide diagnostics to enable fault found of DUT'S in remote locations.

The system may have built in structured data security capability and may include secure communications network functions as a global network provision using Internet and satellite networks to provide access to remote deployed location anywhere globally.

The system may comprise a super system 'system of systems' structure, with organisational systems management structures, with open standards interfaces provision to address global diagnostic solutions, backed up by scalable networks of data warehouses to meet the needs of any diagnostic challenge.

The invention claimed is:

1. A remote testing system, comprising:
a control system linked by communications links to a plurality of distributed relational databases, each database being associated with a test development entity and storing information about products specific to that test development entity, the information including at least one of equipment model data, historic performance data and logistical data specific to respective products;
a device to be tested remote from the control system; and
a test system local to the device, the test system being connectable to the device to perform device testing and being configured to carry out synthetic measurements on the device to be tested based on information from the control system;
the control system being arranged to establish a satellite communications link with the test system;
wherein the control system is configured to receive, via information exchange between the control system, the device to be tested and at least one of the databases, identification information associated with the device, to determine one or more tests to be applied to the device based on the identification information, the identification information including information about the environment in which the device to be tested is currently located and information about logistical support for the device to be tested, the control system further being configured to transmit test software for the one or more determined tests to the test system for running on the test system and test information defining the one or more tests to be applied to the device using the test software, the test information being provided to configure the test system into a synthetic instrument for carrying out specified measurements on the device to be tested, the control system further being configured to receive test results from the test system and to access information held in at least one database to perform analysis of the test results.

2. A system according to claim 1, wherein the test software includes information relating to the device.

3. A system according to claim 1, wherein the control system is arranged to compare the results with results predicted from a system model.

4. A system according to claim 3, wherein the system model comprises:
a combination of a device model and a test system model.

5. A system according to claim 1, wherein the control system is arranged to receive raw data from the device in response to applied tests and to perform measurements on the data at the control system.

6. A remote testing system according to claim 1, comprising:
a plurality of devices to be tested remote from the control system; and
respective test systems local to the devices, the test systems being connectable to the devices to perform device testing; and the control system being arranged to establish a communication link with each of the test systems,
wherein, for each device, the control system is arranged to receive results of test applied to the device, to analyse the results of the tests and to recommend further action, substantially in real time.

7. A method of testing a device remotely from a control system, the control system being linked by communications links to a plurality of distributed relational databases, each database being associated with a test development entity and storing information about products specific to that test development entity, the information comprises at least one of equipment model data, historic performance data and logistical data specific to the products, the method, comprising:
establishing a satellite communications link between the control system and a test system local to the device, the test system being configured to carry out synthetic measurements on the device to be tested based on information from the control system;
receiving identification information for the device at the control system by information exchange between the control system, the test system and at least one of the plurality of databases, the identification information including information about the environment in which the device to be tested is currently located and information about logistical support for the device to be tested;
determining one or more tests to be applied to the device based on the identification information;
transmitting test software for the one or more determined tests to the test system for running on the test system;
transmitting test information defining the one or more tests to be applied to the device using the test software to the test system, the test information configuring the test system into a synthetic instrument for carrying out specified measurements on the device to be tested;
running the test software on the test system to apply the one or more tests to the device;
transmitting the results of the one or more tests to the control system; and
accessing information held in at least one database of the plurality of databases to perform analysis of the results in the control system.

8. A method according to claim 7, comprising:
searching the plurality of distributed relational databases for information relating to the device; and
transmitting the device related information to the test system.

9. A method according to claim 8, comprising:
obtaining one or more measurements from the device at the test system; and
transmitting the measurements from the test system to the control system.

10. A method according to claim 9, comprising:
analysing the received measurements; and transmitting a diagnosis to a user of the test system, substantially in realtime.

11. A method according to claim 10, wherein analysing the received measurements comprises:
   comparing the measurements with a set of expected measurements.

12. A method according to claim 11, wherein the set of expected measurements are determined by applying the tests to a system model.

13. A method according to claim 12, wherein the system model comprises a combination of a model of the device to be tested with a model of the test system.

14. A method according to claim 8, comprising:
   obtaining raw data from the device at the test system;
   transmitting measurements from the test system to the control system; and
   performing measurements on the data at the control system.

15. A computer program, which when executed by a processor, is configured to perform a method according to claim 8.

16. A remote testing system, comprising:
   a control system;
   a device to be tested remote from the control system; and
   a test system local to the device, the test system being connectable to the device to perform device testing and being configured to carry out synthetic measurements on the device to be tested based on information from the control system;
   the control system being arranged to establish a satellite communications link with the test system;
   wherein the control system is configured to receive identification information associated with the device, to determine one or more tests to be applied to the device based on the identification information, the identification information including at least one of information about the environment in which the device to be tested is currently located and information about logistical support for the device to be tested, the control system further being configured to transmit test software for the one or more determined tests to the test system for running on the test system and test information defining the one or more tests to be applied to the device using the test software, the test information being provided to configure the test system into a synthetic instrument for carrying out specified measurements on the device to be tested.

* * * * *